Patented July 21, 1942

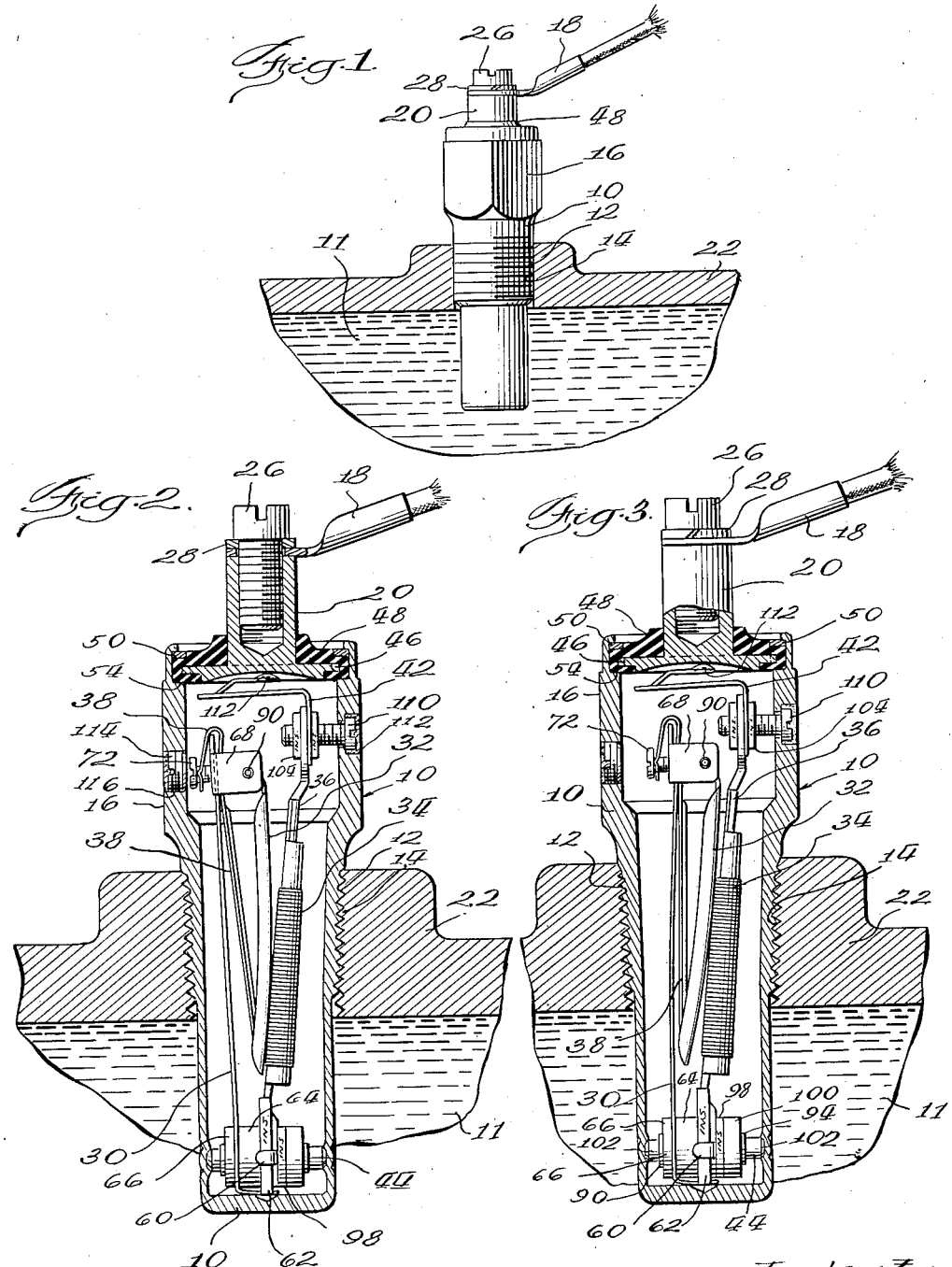

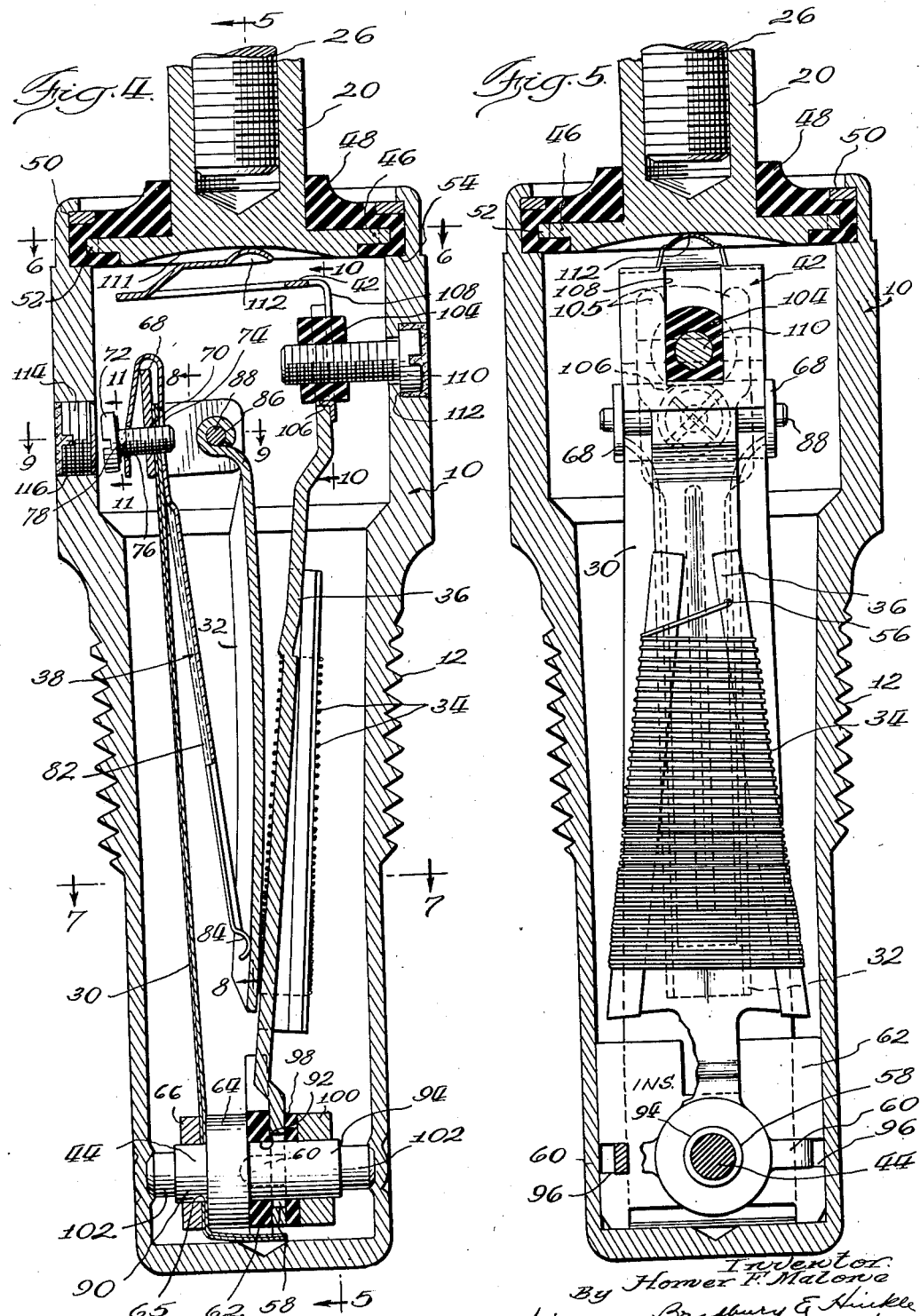

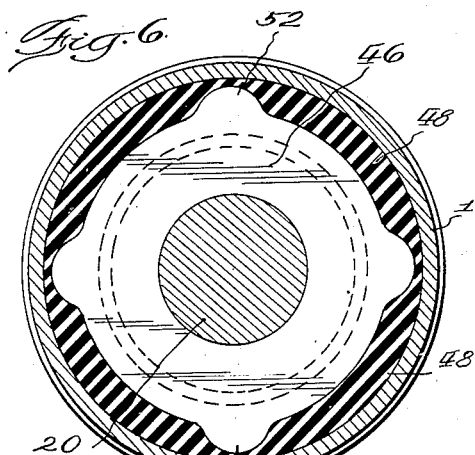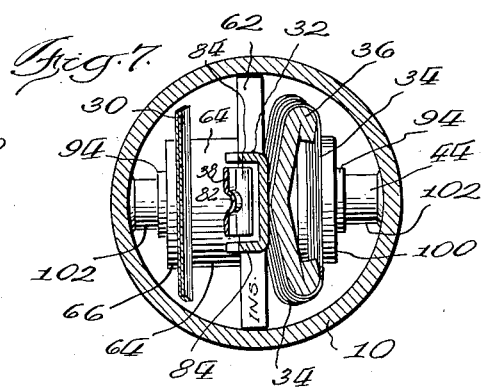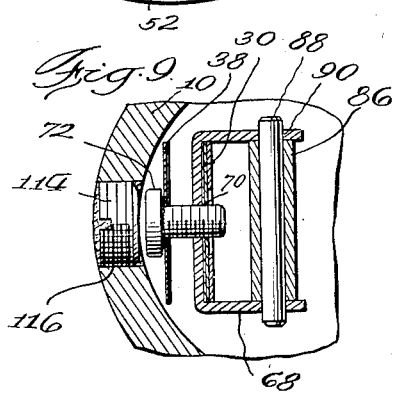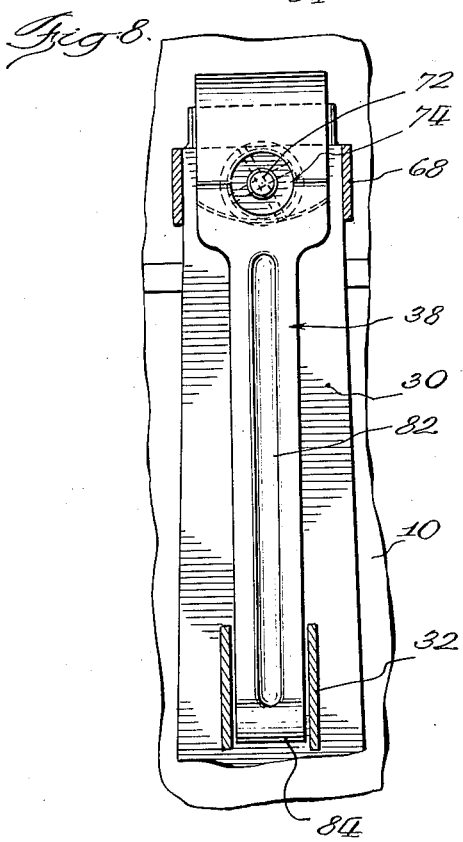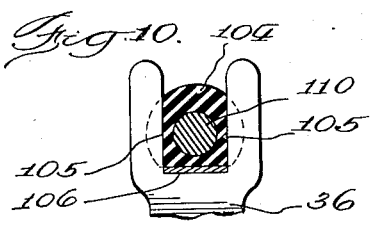

2,290,694

UNITED STATES PATENT OFFICE 2,290,694

SENDING UNIT FOR INDICATORS

Homer F. Malone, Chicago, Ill., assignor to Stewart-Warner Corporation, Chicago, Ill., a corporation of Illinois Application March 22, 1941, Serial No. 384,678

9 Claims. (Cl. 201—48)

My invention relates generally to indicators, and more particularly to an improved sending unit for electrically operated indicators for indicating the temperature of fluids.

An object of my invention is to provide a cheaply manufactured, dependable sending unit for accurately varying the resistance of an electric circuit in response to changes in the temperature of the unit.

Another object of my invention is to provide a simple, reliable sending unit which may be easily installed in the walls of a container or pipe containing a fluid, and which is responsive to the temperature of the fluid therein.

Another object is to provide a compact temperature responsive unit which is suitable for installation upon the engine block of an automobile engine to indicate the temperature of the cooling medium thereof, or which may be installed in the engine crank case to indicate the temperature of the engine lubricant, and which may be used in connection with an electrical indicator located on the instrument panel of the automobile, for example, the indicator disclosed in my application Serial No. 245,077, filed December 12, 1938.

A further object is to provide a device, for indicating the temperature of a fluid, which is easily calibrated and not critical in its adjustment, which will withstand long periods of jolting and vibration without losing its accuracy, which resists corrosion through the ordinary action of the elements, and which is effectively sealed to prevent the entrance of dust and dirt to the working parts thereof.

Other objects will appear from the following description, reference being had to the accompanying drawings in which:

Fig. 1 is an approximately full size view showing my improved temperature indicator installed in the cylinder block of an automobile engine;

Fig. 2 is a partial vertical cross-sectional view of my improved sending unit showing the relation of the working parts thereof when the unit is cold;

Fig. 3 is a view similar to Fig. 2 showing the working parts of my sending unit when the unit is hot;

Fig. 4 is a central vertical cross-sectional view of my improved sending unit;

Fig. 5 is a central vertical cross-sectional view of my improved sending unit taken along the line 5—5 of Fig. 4;

Fig. 6 is a cross-sectional view taken along the line 6—6 of Fig. 4;

Fig. 7 is a cross-sectional view taken along the line 7—7 of Fig. 4;

Fig. 8 is a detail view taken along the line 8—8 of Fig. 4;

Fig. 9 is a detail view taken along the line 9—9 of Fig. 4;

Fig. 10 is a detail view taken along the line 10—10 of Fig. 4; and

Fig. 11 is a detail view taken along the line 11—11 of Fig. 4.

Referring to Fig. 1, the sending unit comprises a generally cylindrical case 10, of heat conducting material, which encloses the working parts. A portion of the case 10 is threaded with three-eighths inch pipe threads 12 to retain it in place in a drilled and tapped hole 14 in a wall 22 of a container containing a fluid 11, the temperature of which is to be indicated. The upper end 16 of the case 10 is hexagonal in shape to facilitate the threading of the case 10 into the hole 14. The terminal 18 of the indicator circuit is held to the binding post 20 of the indicator assembly by a screw 26. A lock washer 28 may be provided between the screw 26 and the terminal 18.

Referring to Figs. 2, 3 and 4, a temperature responsive bi-metal actuator 30 operates the working parts of the unit. A curved contact shoe 32, which is carried by the bi-metal actuator 30, engages the resistance windings 34 of the winding strip 36 to provide electrical communication between the winding 34 and the actuator 30. A flat spring 38, of beryllium copper or other suitably elastic metal, retains the contact shoe 32 to the resistance winding 34. One end of the resistance winding 34 is connected to the winding strip 36, and the remainder of the winding 34 is insulated therefrom.

Current may flow from the binding post 20, through a flat contact spring 42, through the winding strip 36, through the resistance winding 34, to the contact shoe 32. From the contact shoe 32 the current may flow through the actuator 30, to the case 10 which is grounded. The walls of the lower end of the case 10 are reduced in thickness to facilitate heat transfer between the fluid 11 and the actuator 30. As the bi-metallic actuator 30 changes its curvature with changes in temperature, the contact shoe 32 rocks along the winding 34 and the point at which the curved contact shoe 32 is in contact with the resistance winding 34 changes. In this manner, the effective resistance of the unit is positively varied with changes in temperature. The sending unit may be electrically connected in series with a source of electrical current at constant potential and an ammeter. As the current flowing in the circuit would be inversely proportional to the resistance of the sending unit, the ammeter may be calibrated directly to give the temperature of the fluid 11.

Binding post assembly

The binding post 20 is insulated from the case 10 of the indicator by a bushing 48 of phenolic resin which is formed around the flanged lower end 46 of the binding post 20. Phenolic resin and metal have unequal coefficients of expansion and the resin may not tightly retain metal parts about which it is formed. Therefore, to prevent the binding post 20 from rotating with respect to the bushing 48, projections 52 are formed on the periphery of the flange 46. As is shown clearly in Figs. 4 and 5, a metal washer 50 reinforces the upper periphery of the bushing 48. The upper end of the case 10 is reduced in thickness to form a shoulder 54 against which the bushing 48 is seated. The extreme upper end of the case 10 is rolled over to engage the washer 50 and retain the binding post firmly in place.

Resistance assembly

The portion of the winding strip 36 which forms the core of the resistance winding 34 is preferably of a V-shaped cross section, as is shown clearly in Fig. 7, with the apex of the V engaging the contact shoe 32 to maintain the wire taut and to reduce resistance between the winding 34 and the shoe 32, thereby affording a reliable electric connection. The outer edges of this portion of the strip 36 are preferably rolled over to avoid undue stresses and strains in the resistance winding 34, which is preferably of nichrome wire, and also to minimize the danger of breaking down the enamel insulation on this wire. The size of the wire used depends upon the requirements of the particular installation. For a six volt automobile circuit I have found that a winding for forty-three inches of number 37 A. W. G. nichrome wire gives satisfactory results. The strip 36 is coated with a relatively thick coat of non-conducting varnish before it receives the winding 34, thereby insulating the winding from the strip. One end of the winding is secured to the strip 36 by a spot of solder 56, or its equivalent. The other end of the winding is held in place and insulated from the strip 36 by a spot of a suitable non-conducting cement.

Over the temperature range to which my sending unit is subjected, the increment of bi-metal deflection for each increment of temperature change is constant. However, it is necessary that the resistance winding 34 conform to the characteristics of the indicator with which my sending unit is adapted to be used. Therefore, the winding 34 is arranged so that its resistance varies rapidly with a small change in location of the contact point at its lower end, and more slowly with the change of location of the contact point at its upper end. To accomplish this, the sides of the winding strip 36 are tapered inwardly toward the upper end, and the laps of the windings 34 are spaced closely together at the lower end and farther apart at the upper end.

A hole 58 in the lower end of the strip 36 accommodates the spacer 44 which holds the working parts in position. The hole 58 is of appreciably greater diameter than the spacer 44 so that there is no electric contact between these two elements. Transverse tabs 60 extend outwardly from the lower end of the strip 36 and the ends of these tabs 60 are bent at right angles to engage an insulating spacer 62 and hold the winding strip 36 in its proper place.

Actuator and contact shoe assembly

The temperature range which may be indicated by the device is dependent upon the thickness of the bi-metal actuator 30, and I have found that for indicating temperatures in the range between 100° and 220° F., the bi-metal should be .013 inch thick. The lower end of the actuator 30 is bent at right angles and engages the bottom of the case 10 to form an electrical contact between the bi-metal and the ground. The actuator 30 is held in position between a shoulder 64 on a spacer 44 and a collar 66 which is secured to the spacer 44 by a force fit on other suitable means. A trunnion 68 is soldered or spot welded to the upper end of the actuator 30. A drilled and tapped hole 70 extends through the trunnion 68 and bi-metal strip 30 to receive an adjusting screw 72.

The flat spring 38 is carried by the actuator 30 and is positioned to retain the curved shoe 32 in contact with the winding 34. The upper extremity of the spring 38 is bent back on itself, and has a hole 76 to receive the adjusting screw 72. A second hole 74, which registers with the tapped hole 70 when the spring 38 is in position, is provided to receive the tip of the adjusting screw 72. The screw 72 is threaded into the hole 70 to retain the flat spring 38 to the actuator 30. The under surface of the head of the screw 72 is end knurled, as is shown in Fig. 11, and the knurled surface engages a rib 78 formed in the spring 38 to keep the screw 72 from losing its adjustment.

The portion of the spring 38 which extends downwardly has a longitudinal groove 82 formed into it to prevent flexure except at or near its anchored end, and the extreme lower tip 84 which engages the inner side of the contact shoe 30 is given a semi-cylindrical shape to decrease friction between the spring 38 and the shoe 30. The force which the semi-cylindrical end 84 exerts upon the shoe 32 may be controlled by adjusting the screw 72. As this screw is moved inwardly, the force is increased, and as it is moved outwardly, the force is decreased.

The contact shoe 32 is of channel-shaped cross section as is shown in Fig. 7, and the outer surface of the bottom of the channel engages the resistance windings 34. The contact surface of the shoe 32 is advantageously given a continuous curvature so that there are no abrupt changes of the contact point with the temperature. I have found that, in the construction disclosed, desirable characteristics are obtained by making the contact surface of the shoe with a circular curvature having a radius of approximately 5 inches, and that it is advantageous to grind the contact surface to assure a clean, uniform electrical contact along its entire length. The upper end of the shoe 86 is held in place by bending it securely around a pivot pin 88 which passes through holes 90 in the trunnion 68.

Assembly of unit

The working parts are held in place upon a spacer 44 having a collar 64 integrally formed thereon. A generally rectangular fiber spacer 62, having a hole 92 therein, is placed over the cylindrical body portion 94 of the spacer 44. The fiber spacer 62 has kerfs 96 formed in its sides. One surface of the resistance winding strip 36 rests against the fiber spacer 62 and the tabs 60 engage the kerfs 96 to prevent the strip 36 from forming an electrical contact with the spacer 44. An insulating fiber washer 98 on the spacer 44 engages the opposite surface of the winding strip 36. The winding strip 36 is firmly held in place by a metal collar 100 which is placed over the cylindrical body portion 94 and held in place by a press fit. When the winding strip 36 is in place, it preferably has a slight deformation so that its elasticity tends to move it toward the left of the position shown in Fig. 4. The actuator 30, which has a hole 65 in its lower end corresponding in size to the cylindrical body portion 94 of the spacer 44, is assembled in direct contact with the collar 64 and is firmly held in place by a metal ring 66 which is secured by a force fit or other suitable means. The extremities 102 of the spacer 44 are securely held in place in the case 10 by "staking" the walls of the case 10, as is shown in Fig. 5.

A slot 105 is formed in the upper end of the winding strip 36, as is shown in Fig. 10. An internally threaded fiber washer 104 has parallel opposed grooves which engage the inside edges of the slot 105 to prevent the washer 104 from turning. The contact spring 42 also has a slot 108 formed therein, so that it may be placed in position on the fiber washer 104 in much the same manner as the winding strip 36. A lip 106 at the end of the slot 108, engages the base of the slot 105 to retain the contact spring 42 in position. A calibrating screw 110 is passed through a counterbored hole 112 in the walls of the case 10 and is threaded into the washer 104. Inasmuch as the resiliency of the winding strip 36 tends to cause the upper end of the strip to move to the left of the position shown in Fig. 4, the under surface of the head of the screw 110 engages the bottom of the counterbore of the hole 112. The position of the upper end, and the slope of the winding strip 36, may be adjusted by movement of the screw 110. The binding post assembly closes the upper end of the case 10 and the concave contact surface 111 of the binding post 20 engages the spherically curved contact surface 112 of the contact spring 108. The upper end of the walls of the case 10 are rolled over to retain the binding post assembly securely in place.

Calibration of the indicator

The indicator conveniently may be calibrated in a controlled temperature oil bath. It is connected in series with a standard electrical circuit and the adjusting screw 72 and the calibrating screw 110 are moved so that the proper temperature readings are obtained on the ammeter of the circuit. A threaded sealing plug 114 is then placed in a drilled and tapped hole 116 in the wall of the casing 10 and is sealed in place with a waterproof cement. The counterbored hole 112 is sealed with a similar cement. Thus, when the indicator has been calibrated, there is no possibility of its losing its accuracy by the admission of foreign substances to its working parts. Inasmuch as all of the parts of the assembly may be made of corrosion resistant material, the indicator will not lose its accuracy over a long period of time.

Brief summary of operation

The indicator is placed in heat exchange relationship with the fluid 11, the temperature of which is to be measured. It is electrically connected in a circuit comprising a source of electrical current at constant potential and a calibrated ammeter in series with the indicator. When the indicator is cold, the position of the parts are as shown in Fig. 2, and current flows from the source to the indicator, through a large portion of the resistance winding 34, through the contact shoe 32, and through the bi-metal strip 30 to the ground. The resistance of the circuit is thus relatively large and a small amount of current flows through the ammeter. As the fluid 11 becomes warmer, heat is transferred to the actuator 30 and its upper end moves to the right as is shown in Fig. 3. This motion causes the contact shoe 32 to rock upon the resistance winding 34, and reduce the amount of the resistance winding 34 in the circuit, lowering the resistance of the entire circuit. A larger amount of current then flows in the circuit and the ammeter is deflected a correspondingly greater amount. When the fluid 11 is hot, the relative positions of the contact shoe 32 and the resistance winding 34 are as shown in Fig. 3. As the temperature of the fluid 11 decreases, the temperature of the actuator 30 decreases and the contact shoe 32 rocks along the winding 34 to increase the resistance of the circuit and correspondingly decrease the deflection of the ammeter.

It will be understood that while I have illustrated the resistance winding 34 as having a particular shape, giving the rate of resistance change required by an indicator of the kind disclosed in my said co-pending application, other shapes of resistance winding may be used to give other resistance change characteristics to adapt my sending unit for use with other indicators having different performance characteristics.

While I have described my invention in accordance with a preferred embodiment thereof, it will be apparent to those skilled in the art that numerous modifications can be made of the construction disclosed without departing from the underlying principles of my invention. I, therefore, wish to include within the scope of my invention, all modifications in which substantially the results of my invention are obtained by substantially the same or equivalent means.

I claim:

1. In a sending unit for an electrical indicating system, the combination of a casing of heat conducting material an electrical resistance unit inclosed by said casing, said unit having a terminal at one end, and a series of contact points disposed along its surface in a substantially straight line, the resistance between said terminal and each of said contact points varying continuously from point to point along the series, said resistance unit being fixed at one end thereof and being disposed in the same general direction as the axis of said casing, an adjustment for controlling the slope of the resistance unit with respect to the axis of said casing, a curved contact shoe for establishing electrical contact with the contact points of said series in succession as said shoe is rocked along said series of points, and temperature responsive means for rocking said shoe in response to changes in the temperature thereof, whereby the effective resistance of said resistance element is continuously varied with changes in said temperature.

2. In a sending unit for an electrical indicating system, the combination of a heat conducting casing a core enclosed by said casing and having a ridge thereon disposed along the axis thereof, a winding of resistance wire around said core and disposed along said axis, the loops of said winding being electrically insulated from each other and from said core, an electrical conductor for connecting the end of said winding with a terminal, a contact shoe, having a curved contact surface, for establishing electrical contact with said winding along said ridge, a temperature responsive bi-metal element affixed only at one end thereof and pivotally secured at its free end to one end of said contact shoe for rocking said shoe along said ridge in response to the changes in the temperature of said bi-metal element, a flat spring carried by said free end of said bi-metal element and engaging the contact shoe to retain it in contact with said winding along said ridge, and means providing an electrical conductor connecting said contact shoe with a second terminal, whereby the effective resistance between said terminals is continuously varied with changes in the temperature of said bi-metal element.

3. In a sending unit for an electrical indicating system, the combination of a heat conducting casing enclosing an electrical resistance unit comprising a core and a winding consisting of a series of loops of resistance wire encircling said core and disposed along the axis thereof, said loops being insulated from each other, an electrical conductor connecting one end of said winding with a terminal, a contact shoe having a continuously curved contact surface for establishing electrical connection with said winding, means providing an electrical connection between said shoe and a terminal, a temperature responsive bi-metal element affixed at one end thereof and pivotally secured at its free end to said contact shoe to rock said contact shoe along said resistance unit in response to changes in the temperature of said bi-metal element, whereby the effective resistance between said terminals varies continuously as the temperature of said bi-metal element changes, and resilient means carried by said free end of said bi-metal element to engage said contact shoe and retain it in contact with said resistance unit.

4. In a sending unit for an electrical indicating system, a generally cylindrical case of heat conducting material enclosing a resistance unit comprising a resistance winding around a core and disposed along the axis thereof, an electrical conductor connecting one end of said winding with a terminal, a contact shoe having a curved contact surface for making contact with said winding, a bi-metal strip carrying said contact shoe, said contact shoe being pivotally secured at one end to one end of said strip, means for rigidly supporting the other end of said strip, resilient means for retaining said shoe against the surface of said winding, and an electrical conductor connecting said shoe with a second terminal, whereby changes in the temperature of said bi-metal strip cause said shoe to rock along said winding thereby varying the effective resistance between said terminals, said contact shoe, bi-metal strip and resistance winding being generally parallel to and opposite each other.

5. In a sending unit for an electrical temperature indicating system, the combination of a generally cylindrical case of heat conducting material enclosing a resistance unit comprising, a resistance winding consisting of a series of loops of resistance wire placed around a core and disposed along the axis thereof, said loops being insulated from said core and from each other, an electrical conductor connecting one end of said winding with an electrical terminal, a bi-metallic strip fixed at one end, a contact shoe having a curved contact surface for making contact with said winding carried by and pivotally secured to the other end of said bi-metal strip and located opposite said strip, resilient means engaging said bi-metal strip and said contact shoe for retaining said shoe against the surface of said winding, and an electrical conductor connecting said shoe with the second terminal whereby the changes in the temperature of said bi-metal strip cause said shoe to rock along said winding, thereby varying the effective resistance between said terminals.

6. In as sending unit for an electrical temperature indicating system, the combination of a generally cylindrical case of heat conducting material enclosing a resistance element comprising a winding of resistance wire wound around a core and disposed along the axis thereof, the loops of said winding being insulated from each other, said core being disposed in the same general direction as the axis of said case, means for affixing one end of said resistance element to said case, an adjustment for controlling the slope of said element with respect to the axis of said case, an electrical conductor connecting one end of said winding with a terminal, a contact shoe having a curved contact surface opposite to and making contact with said winding, a bi-metal strip opposite said contact shoe and resistance element, said bi-metal strip being fixed at one end thereof and pivotally secured at the other end to one end of said contact shoe, resilient means for retaining said shoe in contact with said winding, and an electrical conductor connecting said contact shoe with a second terminal, whereby changes in the temperature of said bi-metal strip cause said shoe to rock along said winding and thereby vary the effective resistance between said terminals.

7. In a sending unit for an electrical indicating system, the combination of a generally cylindrical case of heat conducting material enclosing a resistance element comprising a core, a winding of resistance wire around said core and disposed along the axis thereof, the loops of said winding being insulated from each other and from said core, said core being disposed in the same general direction as the axis of said shell, an electrical conductor connecting one end of said winding with the terminal, a bi-metal temperature responsive strip affixed at one end thereof and located opposite said resistance element, a contact shoe having a curved contact surface for making contact with said winding, said contact shoe being pivotally secured at one end to the other end of said bi-metal strip and carried thereby, a flat spring carried by said other end of said bi-metal strip and engaging said contact shoe to retain it in contact with said resistance winding, and an adjustment comprising a screw carried by said bi-metal strip and engaging said flat spring to control the deformation thereof, whereby the force with which said contact shoe engages said resistance winding may be varied, and an electrical conductor connecting said contact shoe with a second terminal, whereby changes in the temperature of said bi-metal strip will vary the effective resistance between said terminals.

8. In a sending unit for an electrical temperature indicating system, the combination of a heat conducting casing, an elongated resistance element enclosed by said casing and disposed in the same general direction as the axis of the casing, an adjustment for controlling the slope of said resistance element with respect to the axis of said casing, an electrical conductor connecting one end of said resistance element with a terminal, a contact shoe having a curved surface for making contact with said resistance element, an electrical conductor connecting said contact shoe with a second terminal, and a bi-metal strip fixed at one end thereof and secured at the other end to said contact shoe, whereby changes in the temperature of said bi-metal strip cause said shoe to rock along said resistance element and thereby vary the effective resistance between said terminals.

9. In a sending unit for an electrical indicating system, the combination of a generally cylindrical casing of heat conducting material, an elongated resistance element enclosed by said casing and disposed in the same general direction as the axis of the casing, an adjustment for controlling the slope of said resistance element with respect to the axis of said casing, an electrical conductor connecting one end of said resistance element with a terminal, a contact shoe having a curved surface for making contact with said resistance element, a bi-metal strip fixed at one end thereof and pivotally secured at its free end to said contact shoe, a flat spring carried by the free end of the bi-metal strip and engaging the contact shoe to retain it in contact with the resistance element, an adjustment comprising a screw carried by said bi-metal strip and engaging said flat spring to control the tension thereof, whereby the force with which said contact shoe engages said resistance element may be varied, and an electrical conductor connecting said contact shoe with a second terminal whereby changes in the temperature of said bi-metal strip will vary the effective resistance between said terminals.

HOMER F. MALONE.